Figure 1:
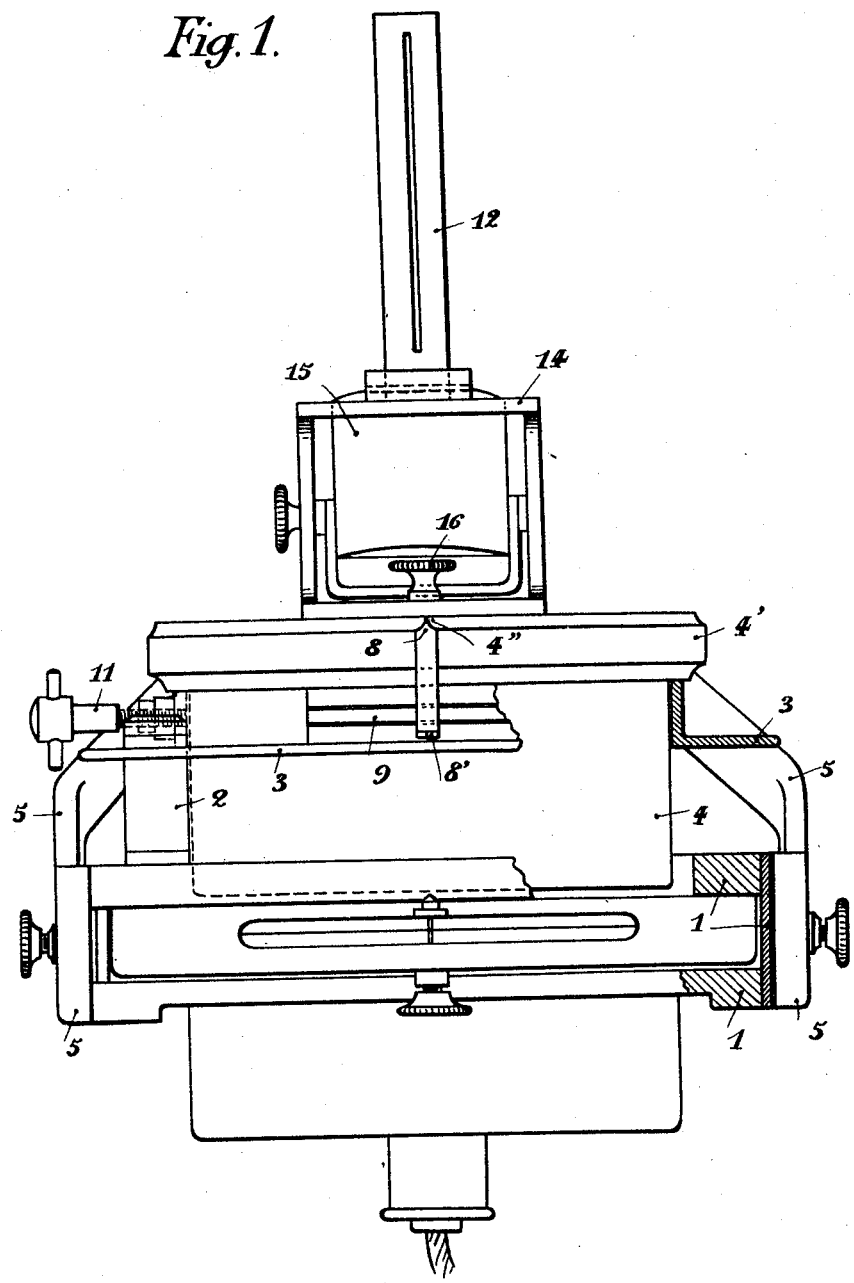

Dec. 4, 1928.

E. VION

COMPASS

Filed June 17, 1927  4 Sheets-Sheet 3

Inventor
Eugene Vion
by Connolly Bro
Attys.

Dec. 4, 1928.  1,694,194
E. VION
COMPASS
Filed June 17, 1927  4 Sheets-Sheet 4
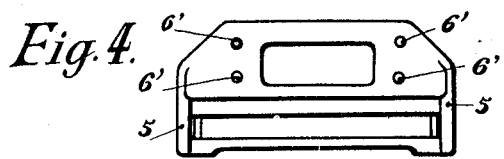
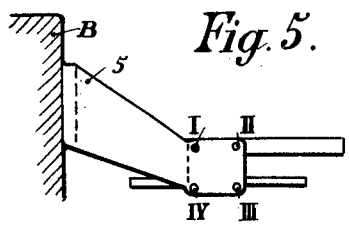
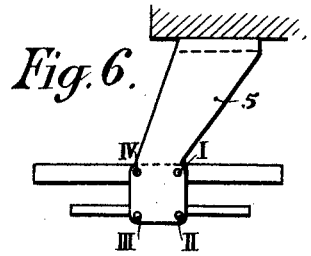
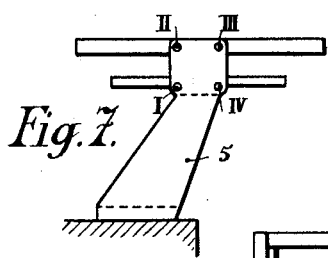
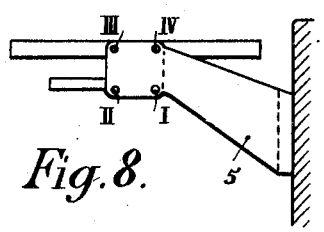
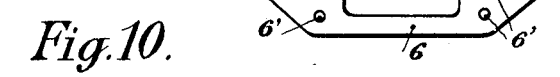
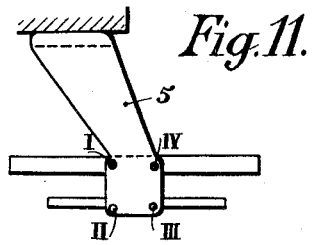
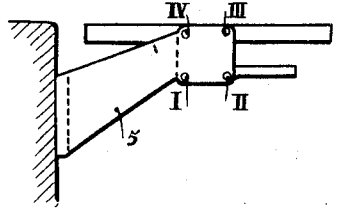
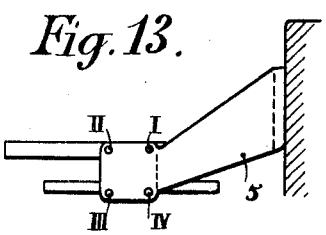
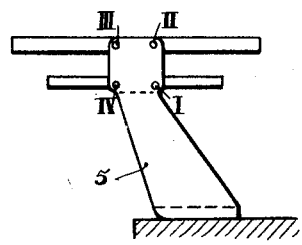
Inventor
Eugene Vion
by Connolly Bros
Attys Patented Dec. 4, 1928.

1,694,194

UNITED STATES PATENT OFFICE.

EUGÈNE VION, OF PARIS, FRANCE.

COMPASS.

Application filed June 17, 1927, Serial No. 199,488, and in France January 28, 1927.

The present invention relates to an improved pilot's compass which is provided with means for enabling it to be converted into an azimuth compass.

The types of compass which are specially designed for use as azimuth compasses cannot, as is well known, be used in practice as pilots' compasses. On the other hand the conversion of a pilot's compass into an azimuth compass necessitates the dismounting of one or more parts of the said compass in order to adapt to it the device which renders it possible to use it as an azimuth compass for taking bearings.

In the case both of the azimuth compass proper and of the converted compass the auxiliary device for taking bearings is displaced angularly with regard to the fixed bowl which necessitates the employment for the said auxiliary device of a real pivot having as its geometrical axis the vertical axis of rotation of the horizontal compass card or rose, or else the employment of a guide crown having its centre on this axis.

The principal object of the present invention is to provide a pilot's compass which is specially provided with means which render it possible to convert said compass instantaneously into an azimuth compass for taking bearings.

The said means comprise a special adaptation of the existing members of the pilot's compass and their combination with a special arm or alidade in such a manner that the conversion may be effected without either exchanging or dismounting any member of the apparatus proper, the combination of the existing members and of the special alidade furnishing all the elements of an apparatus for taking bearings, and the binnacle of the compass being provided with a support which renders it possible to elevate it immediately.

According to the invention the pivot or the crown, which in the known apparatus rendered it possible to obtain an angular displacement of the alidade with regard to the bowl of the compass, is done away with and the prism or other reflecting member, which hitherto had to be dismounted in order to permit of angular displacements of the alidade, is retained in place on the bowl. In order to carry this simplification into effect the binnacle and the bowl are arranged in such manner that the latter can effect one or more revolutions in the binnacle, and the alidade is fixed to the bowl. It is thus rendered possible to rotate the complete unit consisting of the bowl, the reflector and the alidade attached to the said bowl with regard to the rose. This construction, whilst offering a simplification of design and a reduction of the number of manipulations for converting, also renders it possible to employ the reflecting and magnifying member, which has been retained in place, in order to effect simultaneously the sighting of the point in the alidade and the reading of the bearing (angle between the projection of the plane of vision and the direction of the magnetic north pole).

The alidade is, of course, specially constructed so as to enable it to be employed in combination with the prism or other member which is retained in place. The said alidade comprises an alidade carrier consisting of a frame having a window, in one of the faces of which frame the reflector engages.

This reflector, which consists preferably of a magnifying prism, transmits the magnified image of the rose to the eye and thus provides for perfect visibility of the said rose, although the eye, which is placed behind the observation slit of the alidade, would be, in the case of small types of compasses, at a distance from the lower rose less than the distance of the ponctum proximum.

Furthermore the new device renders it possible, in order to observe the plane of vision of the alidate in front of the scale divisions of the rose, to employ the pointer which normally serves in the case of the pilot's compass for reading the points of the compass, the plane of vision of the alidade passing according to the invention through this pointer.

Figure 2:
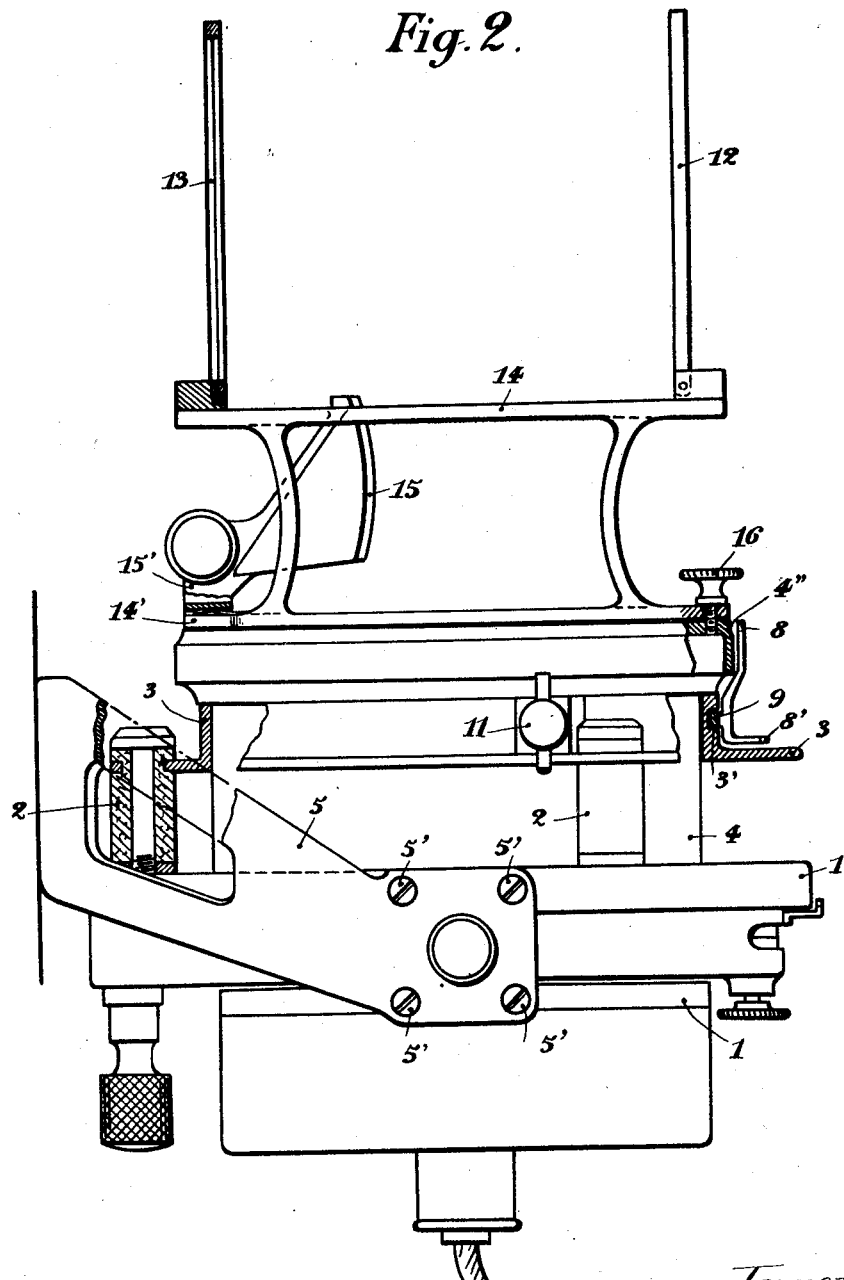
Figure 3:
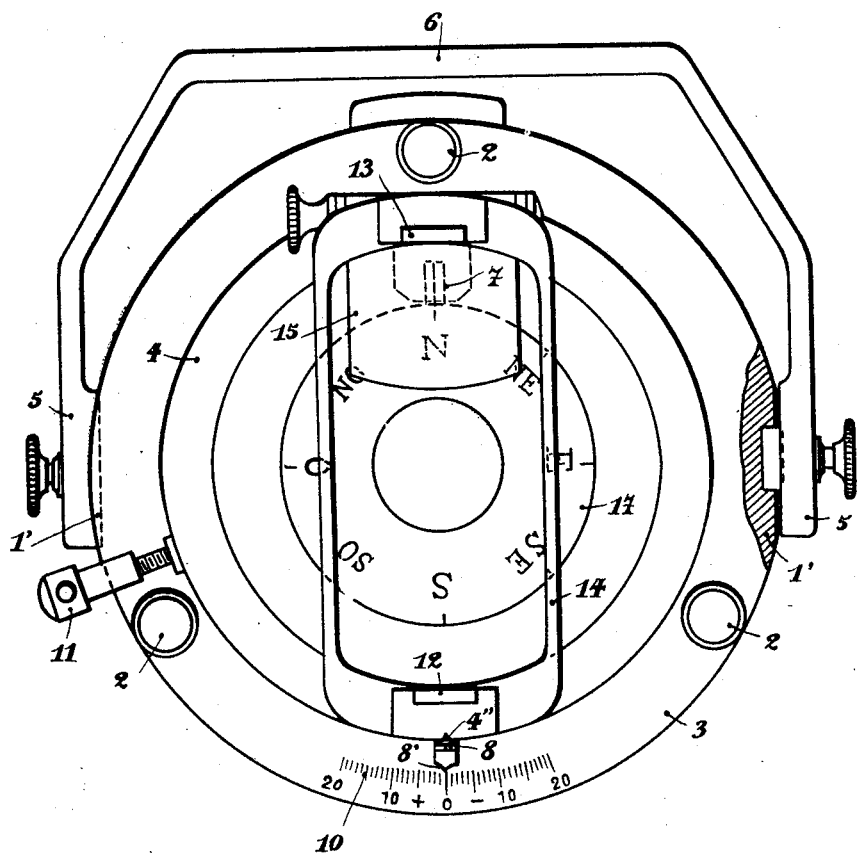

One constructional form according to the invention is illustrated by way of example in the accompanying drawings, in which:

Fig. 1 is a front elevation of the apparatus,
Fig. 2 is a side elevation,
Fig. 3 is a plan,
Figs. 4 to 13 show on a reduced scale the raising support of the binnacle in various positions.

The binnacle 1 comprises a kind of cage, which serves, on the one hand, as a support for the compensating apparatus, and, on the other hand, through the medium of rubber buffers 2, as a support for a collar 3 in which the bowl 4 of the compass is inserted, this latter resting on the upper flange of the said collar and being capable of being displaced angularly together with the reflecting prism 15 which it carries.

The cage is formed with two flat surfaces 1' on the right and left hand sides respectively. At each of these flat surfaces is attached one of the branches 5 of the special raising device which takes the form of a yoke 5—6—5, said branches being each attached to the cage by means of four screws 5' (Fig. 2) located at the four corners of the square end portions of the branches. The method of employment and the advantages of this support will be described hereinafter.

The bowl 4 of the compass can turn freely about its geometrical axis in such manner that the pointer 7 (Fig. 3) which indicates the reference line of the compass can assume any desired circumferential position with regard to the binnacle 1.

The alidade which is provided in known manner with a sight 12 and a window 13 is supported on an alidade carrier 14 having a window, said alidade carrier being of special construction and being arranged in such a way that the alidade proper is located above the prism or other reflecting member 15.

The sight and the window may also be adapted to fold over on the alidade carrier for the sake of convenience when the alidade is not being used.

A projection 14' on the base of the alidade carrier engages under the support 15' of the prism 15 and the said base is fixed by means of a milled-head nut 16 on the closure ring 4' of the bowl 4. The plane of vision of the alidade is thus adapted by this arrangement of the parts to pass through the reference line of the compass.

In the example shown the base of the alidade carrier is provided with four supporting members, between two of which the observation prism 15 is mounted, which can be inclined as desired to suit the prevailing conditions. In these circumstances the eye located behind the slit of the sight 12, observes the rose 17 and the reference line 7 in the magnifying prism 15, the magnification rendering them visible although they are at a distance from the eye less than that of the ponctum proximum.

The plane of vision being directed on to the point, of which the compass bearings are to be taken, the eye will simultaneously observe the said point, the rose and the reference line. The scale division of the rose which is below the reference line will correspond to the compass bearing of the sighted point. In order to direct the plane of vision on to the point in question the unit formed by the alidade 12—13—14 and the bowl 4 bearing the reference line 7 and the prism 15 are turned in the collar 3.

When it is desired to use the apparatus as a pilot's compass the reference line is brought back into a suitable position after the bearings have been taken. It is only necessary for this purpose to turn the compass in the collar in such manner as to bring the guide pointer 4" (Figs. 1 and 3) carried by the bowl 4 in front of the point 8 of a pointer carried by a cursor 9 adapted to slide in a groove 3" of the collar 3. The reference line may be placed in a fixed position with regard to the binnacle and the bowl may be fixed in this position by means of a locking screw 11. The said position may, for instance, be chosen so as to correspond to that in which the reference line is parallel to the longitudinal axis of the aeroplane or of the vessel carrying the compass, or to that in which the reference line is at such an angle with the said axis corresponding to the constant deviation of the rose, so that the corresponding correction is effected in known manner once and for all. For this purpose a second point 8' is provided on the pointer of the cursor 9, which point is adapted to be moved with regard to the collar 3 in front of a scale 10. This arrangement renders is possible to make the correction for the constant deviation and the correction for the parallelism of the reference line of the compass simultaneously in accordance with the standard method in which a coefficient A is calculated which is equivalent to the algebraical sum of the constant deviation and of the error of the reference line.

In order to calculate this coefficient A, the point 8' of the cursor 9 is set in front of the zero of the scale 10 provided on the collar 3, and the guide line 4" of the compass is set in front of the point 8 of the cursor 9. A is determined according to the standard method and then the point 8' is set in front of the particular graduation line of the scale 10 which corresponds to the positive or negative value found for A. It is then only necessary once again to set the guide line 4" in front of the point 8. By means of the locking key 11 the bowl 4 is then fixed in this position, to which it may be brought back again at will after having been moved away—for instance, after the operation of taking the bearings has been completed.

As mentioned above, the compass is carried on a special support constructed in the form of a yoke and preferably having the limbs of the yoke inclined with regard to the base. The instrument is mounted between the said limbs 5, the base 6 of the said yoke serving thus for the attachment of the instrument, as desired, against a vertical surface or against a horizontal surface by means of screws passing through the holes 6'.

Each of the limbs of the yoke terminates as aforementioned, in a foot of square shape and is provided with four holes I, II, III, IV (Figs. 5 and 13) arranged at the corners of a square, said holes serving for the passage of the screws 5'.

Figs. 4 and 5 show one position of the yoke with regard to the compass. This position corresponds to the attachment of the instrument against a vertical surface of the side in front of the compass. This position is not a practical one in which to employ the compass for taking bearings, inasmuch as in this case the instrument is lowered.

By mounting the support as shown in Figs. 9 and 10 in elevation and side view respectively, the compass is raised and thus leaves the field of vision free for observations by means of the alidade.

The changing-over from the position shown in Figs. 4 and 5 to that shown in Figs. 9 and 10 is effected very easily by simply unscrewing the screws 5' and turning the yoke through an angle of 180°, the left hand limb being thus brought to the right and vice versa.

Figures 6, 7, 8, 11, 12 and 13 show six other positions of the yoke, the most suitable of which may be chosen for use according to the circumstances and according to the available horizontal or vertical surfaces. The apparatus will retain in any of the said positions the same orientation.

As has been made clear, it is thus possible with the apparatus described by virtue of its special binnacle and special support to effect very rapidly not only the conversion from a pilot's compass to an azimuth compass, but also the reverse conversion.

I claim:

1. A compass comprising, in combination, a binnacle, a collar on said binnacle, a compass bowl mounted within said collar, and rotatable with regard to said collar, about the geometrical axis of the compass, a covering ring on said bowl, a frame mounted on said covering ring and provided with standards, an alidade mounted on said frame, a reflecting and magnifying member mounted on said bowl and between said standards, means for attaching said frame to said covering ring, and a locking member by which the said bowl, the reflecting and magnifying member and the alidade are rendered immovable with regard to said collar.

2. A compass, comprising, in combination, a binnacle, a collar on said binnacle, a compass bowl mounted within said collar and rotatable with regard to said collar about the geometrical axis of the compass, a covering ring on said bowl, a frame mounted on said covering ring and provided with standards, an alidade mounted on said frame, a reflecting and magnifying member mounted on said bowl and between said standards, means for attaching said frame to said covering ring, a cursor movable in a slot formed in said collar, a pointer having two indicating points, mounted on said cursor, an indicating member on said bowl, movable with regard to one of said points, and a scale on said collar, with regard to which the other of said points is movable.

3. A compass, comprising, in combination, a binnacle, a compass bowl, mounted within said collar and rotatable with regard thereto, around the geometrical axis of the compass, a covering ring on said bowl, a frame work mounted on said covering ring and provided with standards, an alidade mounted on said frame, a reflecting and magnifying member, mounted on said bowl and between said standards, means for fixedly attaching said frame to said covering ring, a yoke member supporting said binnacle, comprising two limbs adapted to support said binnacle and a base constructed and adapted to enable said yoke member to be attached to a horizontal or vertical surface on the craft to be navigated, in various positions, said limbs being inclined to said base whereby their angular position with regard to the horizontal plane may be varied to raise or lower the compass.

In testimony whereof I have signed my name to this specification.

EUGÈNE VION.